United States Patent
Markel et al.

(10) Patent No.: US 9,649,954 B2
(45) Date of Patent: May 16, 2017

(54) VEHICLE SEAT, IN PARTICULAR A MOTOR VEHICLE SEAT

(75) Inventors: Christian Markel, Alzey (DE); Thomas Dill, Heiligenmoschel (DE); Wolfgang Pluta, Heiligenmoschel (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 0 days.

(21) Appl. No.: 13/879,343

(22) PCT Filed: Aug. 26, 2011

(86) PCT No.: PCT/EP2011/004305
§ 371 (c)(1),
(2), (4) Date: Jun. 24, 2013

(87) PCT Pub. No.: WO2012/052088
PCT Pub. Date: Apr. 26, 2012

(65) Prior Publication Data
US 2013/0278035 A1    Oct. 24, 2013

(30) Foreign Application Priority Data
Oct. 19, 2010  (DE) .................. 10 2010 049 328

(51) Int. Cl.
*A47C 7/00*  (2006.01)
*B60N 2/20*  (2006.01)
(Continued)

(52) U.S. Cl.
CPC ............... *B60N 2/20* (2013.01); *B60N 2/22* (2013.01); *B60N 2/68* (2013.01); *B60N 2/682* (2013.01)

(58) Field of Classification Search
CPC .... A47C 4/02; A47C 7/42; B60N 2/68; B60N 2/682
(Continued)

(56) References Cited

U.S. PATENT DOCUMENTS 5,050,932 A *  9/1991  Pipon et al. ............. 297/354.12
5,634,689 A    6/1997  Putsch et al.
(Continued)

FOREIGN PATENT DOCUMENTS

CN    2712705 Y    7/2005
CN    1819787 A    8/2006
(Continued)

OTHER PUBLICATIONS

Office Action dated May 13, 2014 received in corresponding Japanese Application No. 2013-534181.
(Continued)

*Primary Examiner* — David R Dunn
*Assistant Examiner* — Alexander Harrison
(74) *Attorney, Agent, or Firm* — Foley & Lardner LLP

(57) ABSTRACT

A vehicle seat, in particular a motor vehicle seat, has a seat part and a backrest which is provided with a backrest frame which runs all around as a load-bearing structure. The backrest frame has a lower crossmember, two side parts and an upper crossmember. The backrest can pivot relative to the seat part by at least one fitting which is attached to the backrest frame. At least one corner piece is provided as part of the backrest frame, which corner piece connects the lower crossmember to one of the seat parts. The fitting is attached to the corner piece.

15 Claims, 2 Drawing Sheets

Figure 1:
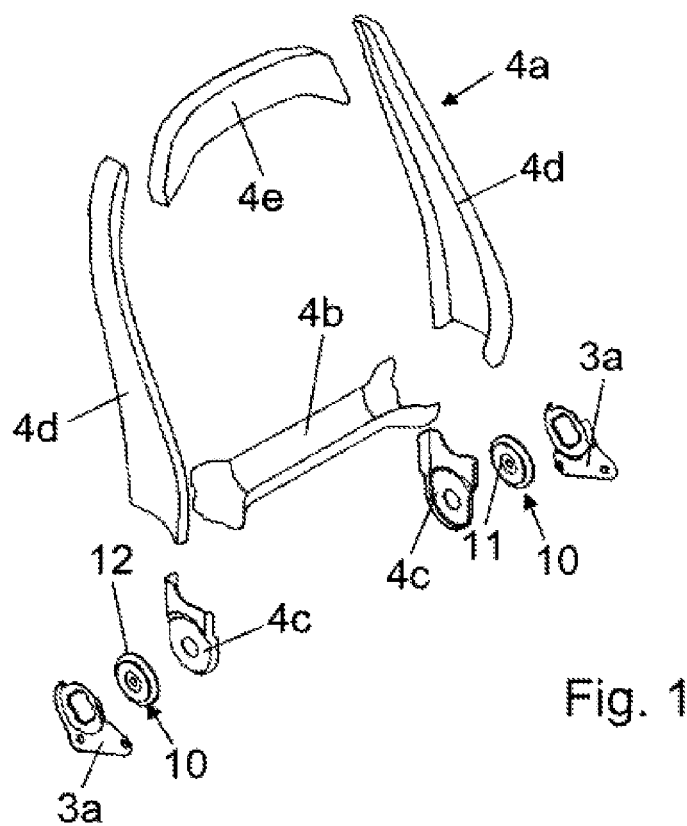

(51) Int. Cl.
*B60N 2/22* (2006.01)
*B60N 2/68* (2006.01)

(58) Field of Classification Search
USPC .............. 297/440.15, 440.2, 452.18, 440.16, 297/440.21, 452.2
See application file for complete search history.

(56) References Cited

U.S. PATENT DOCUMENTS

| | | | |
|---|---|---|---|
| 5,791,738 A | 8/1998 | Niezoldt | |
| 5,816,656 A | 10/1998 | Hoshihara et al. | |
| 5,918,943 A * | 7/1999 | Mitschelen et al. | 297/452.18 |
| 6,082,823 A * | 7/2000 | Aumont et al. | 297/452.2 |
| 6,092,874 A | 7/2000 | Kojima et al. | |
| 6,505,889 B2 * | 1/2003 | Frolo et al. | 297/354.12 |
| 6,685,272 B1 * | 2/2004 | Bonk et al. | 297/463.1 |
| 6,761,412 B1 * | 7/2004 | Garnweidner et al. | 297/452.18 |
| 7,066,552 B2 | 6/2006 | Yoshida | |
| 7,077,478 B2 * | 7/2006 | Nakamura | 297/452.18 |
| 7,354,108 B2 * | 4/2008 | Matsumoto et al. | 297/362 |
| 7,469,967 B1 * | 12/2008 | Hori et al. | 297/452.18 |
| 7,677,667 B2 | 3/2010 | Peters et al. | |
| 8,002,354 B2 * | 8/2011 | Chen | 297/378.1 |
| 8,267,479 B2 | 9/2012 | Yamada et al. | |
| 8,366,198 B2 * | 2/2013 | Thiel | 297/374 |
| 8,517,470 B2 * | 8/2013 | Roth et al. | 297/362.12 |
| 2004/0227389 A1 | 11/2004 | Yoshida | |
| 2005/0236880 A1 * | 10/2005 | Kojima | 297/354.1 |
| 2006/0145522 A1 * | 7/2006 | Yamada | 297/367 |
| 2006/0175885 A1 * | 8/2006 | Syrowik et al. | 297/354.1 |
| 2007/0029860 A1 * | 2/2007 | Yamada | 297/440.21 |
| 2007/0170764 A1 | 7/2007 | Thiel et al. | |
| 2011/0193391 A1 * | 8/2011 | Mitsuhashi | 297/354.1 |
| 2012/0248841 A1 * | 10/2012 | Hellrung et al. | 297/354.1 |
| 2012/0306254 A1 * | 12/2012 | Ishihara | 297/354.1 |
| 2013/0119715 A1 * | 5/2013 | Medoro et al. | 297/180.1 |
| 2014/0284984 A1 * | 9/2014 | Yamada et al. | 297/366 |

FOREIGN PATENT DOCUMENTS

| | | |
|---|---|---|
| CN | 101415584 A | 4/2009 |
| CN | 101778736 A | 7/2010 |
| DE | 19514941 A1 | 10/1996 |
| DE | 19613164 A1 | 10/1997 |
| DE | 1020080 38 851 A1 | 2/2010 |
| DE | 102008038851 A1 | 2/2010 |
| JP | 61-276513 S | 12/1986 |
| JP | 2008-067722 A | 3/2008 |
| WO | WO-2009/066533 A1 | 5/2009 |

OTHER PUBLICATIONS

International Search Report for International Application No. PCT/EP2011/004305 and English translation, date of mailing Dec. 22, 2011, 5 pages.
Office Action dated Dec. 23, 2014 in corresponding Chinese application No. 201180050471.8, 12 pages.

* cited by examiner

VEHICLE SEAT, IN PARTICULAR A MOTOR VEHICLE SEAT

CROSS REFERENCE TO RELATED APPLICATIONS

The present application is a National Stage of International Application No. PCT/EP2011/004305 filed on Aug. 26, 2011, which claims the benefit of German Patent Application No. 10 2010 049 328.7 filed on Oct. 19, 2010, the entire disclosures of which are incorporated herein by reference.

The invention relates to a vehicle seat with the features of the preamble of claim 1.

In the case of known vehicle seats of this type, the backrest frame has two side parts which are connected at the top and bottom by means of a crossmember in each case, as a result of which the backrest frame is peripherally closed. The two fittings by means of which the backrest is pivotable relative to the seat part are in each case fastened to the side part. The deformations of the side part are limited if said side parts are composed of special materials. In addition, different functionalities of the fittings lead to a formation of variants requiring different tools.

The invention is based on the object of improving a vehicle seat of the type mentioned at the beginning. This object is achieved according to the invention by a vehicle seat with the features of claim 1. Advantageous refinements are the subject matter of the dependent claims.

The corner piece according to the invention is part of the backrest frame, i.e. the backrest frame would not be peripherally closed without the corner piece. The side parts and the lower crossmember are spaced apart from one another, without direct contact and without direct connection apart from by means of the corner pieces, via which force flows. The corner piece firstly permits the side part to be formed from a thin, high-strength steel without excessive deformations by geometrically larger deformations being able to be formed in the corner piece. In addition, the corner piece takes over the intersection between the backrest frame and fitting, which intersection is provided on the side part in the case of known fittings, and therefore the side part can be formed without taking the fitting into consideration. In the case of backrest frames with the formation of variants, the production costs are therefore reduced, in particular in the case of the side part, which requires tools having large dimensions.

Owing to the corner piece, it is possible to provide a formation of variants for the fitting, wherein different (geometrical) dimensions of the different variants of the fitting are compensated for by different variants of the corner piece. The subassembly, which then comprises the corner piece and the fitting, then has intersections with the side part and with the lower crossmember, said intersections being independent of the variants.

The corner pieces also permit a formation of variants in respect of the longitudinal extent of the backrest frame, in which the side parts remain identical parts and are extended to differing extents by the corner pieces.

Despite the formation of variants of corner pieces and fittings, identical or similar load fluxes occur in the different backrest frames because of the similar connection.

Figure 2:
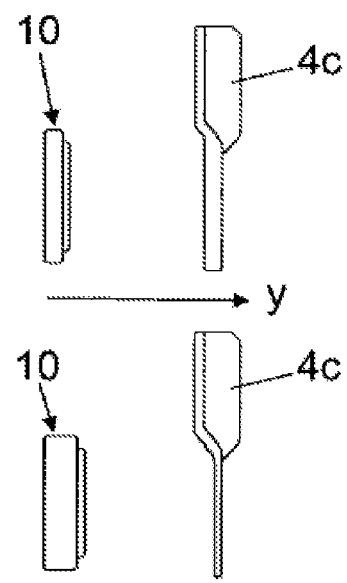
Figure 3:
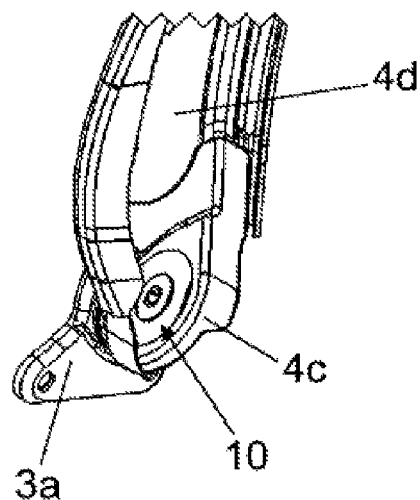
Figure 4:
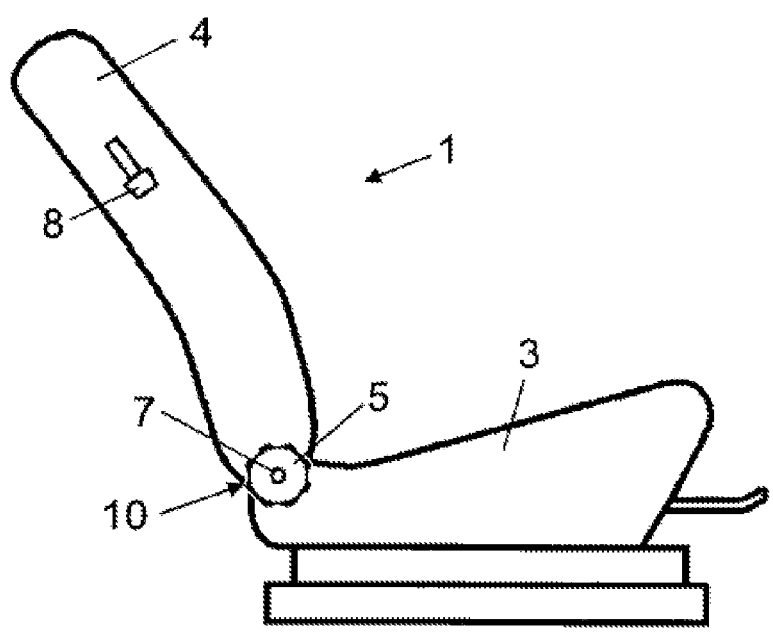

The invention is explained in more detail below with reference to an exemplary embodiment which is illustrated in the drawing, in which FIG. 1 shows an exploded illustration of the structure of the backrest, FIG. 2 shows a side view of two fittings having a different dimension in the y direction and corner pieces matched thereto, FIG. 3 shows a perspective partial view of a subassembly, and FIG. 4 shows a schematic side view of a vehicle seat.

A vehicle seat 1 for a motor vehicle has a seat part 3 and a backrest 4 which is pivotable relative to the seat part 3. The direction of travel of the motor vehicle and the customary arrangement of the vehicle seat 1 in the motor vehicle define the directional details used below, wherein the direction running perpendicularly to the driving direction and horizontally is referred to as the axial direction y.

The backrest 4 is upholstered in a manner known per se and has a backrest frame 4a, which is formed so as to run around the latter, as the supporting structure. The backrest frame 4a has a lower crossmember 4b which, in the axial direction y, runs perpendicularly to the driving direction and horizontally. The lower crossmember 4b is profiled, for example, in a U-shaped manner and is open upward. A corner piece 4c which is described more precisely later is fastened to the two ends of the lower crossmember 4b. A side part 4d is fastened to each of the two corner pieces 4c in turn, and therefore the corner piece 4c is fastened both to the lower crossmember 4b and to one of the side parts 4d and connects them to each other. The upwardly protruding side part 4d is preferably provided with a border pointing inward and tapers upward. An upper crossmember 4e runs parallel to the lower crossmember 4b and is fastened at both of its ends to the upper end of the side part 4d. The crossmembers 4b, 4e, the side parts 4d and the corner pieces 4c therefore form the backrest frame 4a.

The backrest 4 is pivotable relative to the seat part 3 about a pivot axis running in the axial direction y, is preferably adjustable in inclination between various use positions and is optionally freely pivotable (in the case of two-door or three-door motor vehicle seats) when access to a rear seat row is intended to be facilitated. For the adjustment of the inclination of the backrest 4, a drive shaft 7, which is arranged in the axial direction y in the transition region between the seat part 3 and the backrest 4, is rotated manually, for example by means of a hand wheel 5, or by motor, for example by means of an electric motor. For the optionally provided free pivoting of the backrest 4, a hand lever 8 on the side of the backrest 4 is manually actuated. On both sides of the vehicle seat 1, the drive shaft 7 engages for conjoint rotation in a fitting 10, by means of which the backrest 4 is connected to the seat part 3 and is rotatable relative thereto.

Two identical or mirror-inverted fittings 10 are preferably provided, each of which is arranged on precisely one of the two vehicle seat sides and is fastened to the backrest frame 4a. In a modified embodiment, precisely one fitting 10 on one vehicle seat side is combined with a simple rotary joint on the other vehicle seat side. The fitting 10 has at least one first fitting part 11 and one second fitting part 12, which are rotatable relative to each other. The fitting 10 can be designed, for example, as a geared fitting, and therefore the repeatedly rotating drive shaft 7 preferably drives an—in the present case self-locking—eccentric epicyclic gear, as described, for example, in DE 44 36 101 A1 or DE 20 2009 017 811 U1, the disclosure of which in this regard is expressly incorporated. The fitting 10 can also be designed as a latching fitting, and therefore, by means of a small rotation, the drive shaft 7 withdraws bolts contained in the interior of the fitting 10 counter to spring pretensioning, as is described, for example, in DE 10 2006 015 560 B3, the disclosure of which in this regard is expressly incorporated. For the free pivoting, the fitting 10 can have an additional lock in the form of a free pivoting unit, as described, for example, in U.S. Pat. No. 7,571,962 B2, the disclosure of which in this regard is expressly incorporated. As an alternative, the fitting 10 can be composed of two individual fittings, wherein one individual fitting serves for adjusting the inclination and one individual fitting serves for the free pivoting, as is described, for example, in EP 1 799 499 B1, the disclosure of which in this regard is expressly incorporated.

Depending on the functionality thereof, the fitting 10 forms variants (of the vehicle seat 1) from which the fitting can be selected during the assembly of the backrest 4. The variants of the fitting 10 regularly require a differing amount of construction space. In the present case, the intersection between the fitting 10 and the seat part 3 is intended to remain the same in order to restrict the formation of variants to the backrest 4. In order to avoid a sharp increase in the production costs of the backrest 4 by means of said formation of variants, as many identical parts as possible are used, according to the invention, for the formation of the backrest frame 4a, namely the two crossmembers 4b and 4e and the two side parts 4d, which are all independent of the fitting 10 used. This is particularly advantageous for the side parts 4d which are punched out of a thin (0.8 mm), high-strength steel sheet and are deformed—to a limited extent—and which require an expensive tool because of the size thereof.

According to the invention, only the corner pieces 4c are matched to the fittings 10 in a manner dependent on the variant, i.e. are coordinated with the dimensions thereof, wherein each fitting 10 is fastened to one of the corner pieces 4c. The corner piece 4c can be punched out of steel of a thicker material thickness and can be deformed, wherein greater deformations than in the case of the high-strength side part 4d are possible. The corner piece 4c is connected to one of the two fitting parts 11 or 12 of the associated fitting 10. For this purpose, the corner piece 4c preferably has an opening which receives a shoulder or the like on the outer side of the associated fitting part 11 or 12 in a form-fitting manner. The corner piece 4c and the fitting 10 are then welded to each other, in particular by means of laser welding, preferably along the border of the opening and/or of the shoulder of the associated fitting part 11 or 12. The corner piece 4c is preferably provided with a border which points inward in the axial direction y and butts with the outer edge thereof at the top against the associated side part 4d and on the inside against the lower crossmember 4b, preferably in an overlapping manner, and is welded there. An adaptation of the corner piece 4c to the different fittings 10 can then be a step in the axial direction y, which step compensates for the particular axial dimension of the fitting 10, i.e. for that in the axial direction y, but leaves the intersection with the side parts 4d and the lower crossmember 4b, i.e. the position of the outer edge of the border of the corner piece 4c, the same.

The fitting 10 is connected by a seat part adapter 3a to the fitting part 12 or 11 not fastened to the corner piece 4c. The seat part adapter 3a preferably has an opening which receives a shoulder or the like on the outer side of the associated fitting part 12 or 11 in a form-fitting manner. The seat part adapter 3a and the fitting 10 are then welded to each other, in particular by means of laser welding, preferably along the border of the opening and/or of the shoulder of the associated fitting part 12 or 11. The seat part adapter 3a can be an identical part with regard to the formation of variants, or it is adapted to the functionality of the fittings 10 in a manner dependent on the variants.

There are various options with regard to the sequence of assembling the backrest 4. It is preferred that, in a first step, the selected fitting 10 is fastened to the corner piece 4c, which is selected in a manner matched thereto, and to the seat part adapter 3a, and then, in a second step, this subassembly is fastened to the associated side part 4d. The subassembly obtained in this manner is connected in the fourth step to the mirror-inverted counterpart thereof and to the two crossmembers 4b and 4e to give the frame-shaped structure of the backrest 4. Alternatively, in the second step, the two mirror-inverted subassemblies consisting of the corner piece 4b, fitting 10 and seat part adapter 3a are connected to the lower crossmember 4b, and then, in the third step, the subassembly obtained in this manner is connected to the two side parts 4d and to the upper crossmember 4e to form the frame-shaped structure of the backrest 4.

LIST OF DESIGNATIONS

1 Vehicle seat
3 Seat part
3a Seat part adapter
4 Backrest
4a Backrest frame
4b Lower crossmember
4c Corner piece
4d Side part
4e Upper crossmember
5 Hand wheel
7 Drive shaft
8 Hand lever
10 Fitting
11 First fitting part
12 Second fitting part
y y direction

The invention claimed is:
1. A vehicle seat comprising:
a seat part;
a backrest which is rotatably attached to the seat part in a transition region and is provided with a backrest frame, wherein the backrest frame is a supporting structure formed as a circumferential frame comprising a lower crossmember, two side parts and an upper crossmember;
at least one fitting fastened to the backrest frame, having a portion rotatable relative to the seat part, and configured to make the backrest pivotable relative to the seat part,
wherein at least one corner piece is provided as a separate part of the backrest frame, said corner piece being fixed to the lower crossmember such that the corner piece and the lower crossmember are not rotatable relative to each other, said corner piece being fixed to one of the side parts,
wherein the lower crossmember is a separate part from the corner piece,
wherein the fitting is fastened to the corner piece; and
a drive shaft extending through the transition region in an axial direction, wherein the drive shaft is engaged in and conjointly rotatable with the portion of the fitting that is rotatable relative to the seat part,
wherein the corner piece includes an upper part and a lower part, wherein an inner surface on the upper part of the corner piece is configured to receive the lower crossmember, and wherein an outer surface on the lower part of the corner piece is configured to receive a recliner.

2. The vehicle seat as claimed in claim 1, wherein at least one seat part adapter is provided for connection of the fitting to the supporting structure of the seat part.

3. The vehicle seat as claimed in claim 2, wherein the fitting has at least two fitting parts which are rotatable relative to each other and of which one is fastened to the seat part adapter and the other is fastened to the corner piece with a subassembly being formed.

4. A kit comprising:
a seat part;
a backrest which is rotatably attached to the seat part in a transition region and is provided with a backrest frame, wherein the backrest frame is a supporting structure formed as a circumferential frame comprising a lower crossmember, two side parts and an upper crossmember;
a group of at least two fitting variants each having a portion rotatable relative to the seat part and being configured to make the backrest pivotable relative to the seat part, wherein the fitting variants each have at least one different dimension according to the functionality of each of the fitting variants, wherein one fitting variant is selected from the group of at least two fitting variants and is fastened to the backrest frame;
a group of at least two corner piece variants each configured to provide a separate part of the backrest frame to be fixed to one of the side parts and fixed to the lower crossmember such that the one corner piece variant and the lower crossmember are not rotatable relative to each other, wherein one corner piece variant is selected from the group of at least two corner piece variants depending on the one fitting variant,
wherein the lower crossmember is a separate part from the one corner piece variant,
wherein the one fitting variant is fastened to the one corner piece variant; and
a drive shaft extending through the transition region in an axial direction, wherein the drive shaft is engaged in and conjointly rotatable with the portion of the one fitting variant that is rotatable relative to the seat part,
wherein the one corner piece variant includes an upper part and a lower part,
wherein an inner surface on the upper part of the one corner piece variant is configured to receive the lower crossmember, and
wherein an outer surface on the lower part of the one corner piece variant is configured to receive a recliner.

5. The kit as claimed in claim 4, wherein the group of at least two fitting variants includes a first fitting variant and a second fitting variant, wherein the first fitting variant and the second fitting variant have different dimensions from each other in the axial direction, wherein the axial direction is substantially horizontal and perpendicular to a driving direction, wherein the crossmember extends along the axial direction.

6. The kit as claimed in claim 5, wherein the one corner piece variant compensates for the dimensions of the one fitting variant such that the intersections of the side part and the lower crossmember are maintained with each of the fitting variants.

7. The kit as claimed in claim 5, wherein the one corner piece variant has a step in the axial direction, wherein the axial direction is horizontal and perpendicular to a driving direction.

8. The vehicle seat as claimed in claim 1, wherein the backrest has two corner pieces piece and two fittings, wherein both vehicle seat sides has one of the corner pieces and the fittings fastened between each side part and the lower crossmember.

9. A method for assembling a vehicle seat, comprising:
providing a seat part;
providing a backrest which is rotatably attached to the seat part in a transition region and is provided with a backrest frame, wherein the backrest frame is a supporting structure formed as a circumferential frame comprising a lower crossmember, two side parts and an upper crossmember;
providing at least one fitting fastened to the backrest frame, having a portion rotatable relative to the seat part, and configured to make the backrest pivotable relative to the seat part,
wherein at least one corner piece is provided as a separate part of the backrest frame, said corner piece being fixed to the lower crossmember such that the corner piece and the lower crossmember are not rotatable relative to each other, said corner piece being fixed to one of the side parts,
wherein the lower crossmember is a separate part from the corner piece,
wherein the fitting is fastened to the corner piece; and
providing a drive shaft extending through the transition region in an axial direction, wherein the drive shaft is engaged in and conjointly rotatable with the portion of the fitting that is rotatable relative to the seat part,
wherein the corner piece includes an upper part and a lower part,
wherein an inner surface on the upper part of the corner piece is configured to receive the lower crossmember, and
wherein an outer surface on the lower part of the corner piece is configured to receive a recliner,
wherein during the assembly of the backrest, the fitting is selected from fitting variants and the corner piece is selected depending on the selected fitting of the fitting variants in order to compensate for the dimensions of the fitting that differ depending on the fitting variant, wherein dimensions of the side parts and crossmembers are independent of the fitting.

10. The method as claimed in claim 9, wherein during the assembly of the backrest, the fitting is connected to the corner piece and to a seat part adapter with a subassembly being formed, said subassembly preferably being connected to the associated side part.

11. The kit as claimed in claim 4, wherein the group of at least two fitting variants includes a first fitting variant and a second fitting variant, wherein the first fitting variant and the second fitting variant have different thicknesses in the axial direction,
wherein the group of at least two corner piece variants includes a first corner piece variant and a second corner piece variant,
wherein the crossmember extends along the axial direction.

12. The vehicle seat as claimed in claim 11, wherein the first corner piece variant and the second corner piece variant have different thicknesses in the axial direction.

13. The kit as claimed in claim 11, wherein the total thickness in the axial direction of the first fitting variant fastened to the first corner piece variant is equal to the total thickness in the axial direction of the second fitting variant fastened to the second corner piece variant.

14. The kit as claimed in claim 4, wherein the lower crossmember is independent of which one fitting variant is selected from the group of at least two fitting variants.

15. The kit as claimed in claim 4, wherein a relative position between the lower crossmember and each of the two side parts is independent of which one fitting variant is selected from the group of at least two fitting variants.

\* \* \* \* \*